United States Patent [19]

Brandstetter et al.

[11] 4,367,311
[45] Jan. 4, 1983

[54] THERMOPLASTIC MOLDING MATERIAL

[75] Inventors: Franz Brandstetter, Neustadt; Graham E. McKee, Weinheim; Edmund Priebe, Frankenthal, all of Fed. Rep. of Germany

[73] Assignee: BASF Aktiengesellschaft, Ludwigshafen, Fed. Rep. of Germany

[21] Appl. No.: 338,486

[22] Filed: Jan. 11, 1982

[30] Foreign Application Priority Data

Jan. 24, 1981 [DE] Fed. Rep. of Germany ....... 3102254

[51] Int. Cl.³ .......................................... C08L 61/04
[52] U.S. Cl. .................... 525/68; 525/260; 525/261; 525/263; 525/264; 525/308; 525/312; 525/905
[58] Field of Search ................ 525/68, 905, 308, 312

[56] References Cited

U.S. PATENT DOCUMENTS

| | | | |
|---|---|---|---|
| 3,383,435 | 5/1968 | Cizek | 525/68 |
| 3,787,532 | 1/1974 | Carmelite et al. | 525/68 |
| 3,792,123 | 2/1974 | Abolins et al. | 525/68 |
| 4,128,602 | 12/1978 | Katchman et al. | 525/68 |
| 4,128,603 | 12/1978 | Katchman et al. | 525/68 |

*Primary Examiner*—J. Ziegler
*Attorney, Agent, or Firm*—Oblon, Fisher, Spivak, McClelland & Maier

[57] ABSTRACT

The use of alkyl acrylate in the preparation of the soft component of impact-resistant polystyrene based on polystyrene-grafted butadiene mixed with polyphenylene ether reduces the dust attraction of moldings prepared from this type of mixture.

2 Claims, No Drawings

THERMOPLASTIC MOLDING MATERIAL

The present invention relates to a thermoplastic molding material based on styrene polymers which have been made impact-resistant and on polyphenylene ethers.

Thermoplastic molding materials which are useful for the production of moldings and contain impact-resistant styrene polymers together with polyphenylene ethers are disclosed, for example, in U.S. Pat. Nos. 3,383,435, 4,128,602 and 4,128,603. The soft component in these is generally polybutadiene. These molding materials can be used to produce moldings which, compared to impact-resistant styrene polymers not mixed with polyphenylene ethers, exhibit better heat distortion resistance. The properties of such molding materials are generally satisfactory, but it has been found that moldings produced from the materials tend to attract dust easily.

It is an object of the present invention to provide thermoplastic molding materials based on impact-resistant styrene polymers and polyphenylene ethers, which can be used to produce moldings with reduced dust attraction.

We have found that this object is achieved, according to the invention, by thermoplastic molding materials of the above type, wherein the soft component of the impact-resistant styrene polymer consists of a styrene-grafted rubber, the rubber containing, as copolymerized units, from 30 to 80% by weight of an alkyl acrylate, alkyl being of 2 to 8 carbon atoms, and from 20 to 70% by weight of butadiene, with or without from 3 to 10% by weight of a vinyl alkyl ether, alkyl being of 1 to 8 carbon atoms.

For the purposes of the present invention, a molding material is a mixture which can be converted by thermoplastic processing methods, within a certain temperature range, to moldings or to rod, sheet or tube. The molding material may be in the form of granules or powder.

The impact-resistant styrene polymers present in the molding materials can be prepared by any suitable method, provided the above composition is obtained.

The thermoplastic molding materials can contain impact-resistant styrene polymers and polyphenylene ethers in virtually any ratio; for example, they can contain from 5 to 90% by weight of styrene polymer and from 95 to 10% by weight of polyphenylene ether. Particularly suitable materials for the production of moldings contain from 20 to 80% by weight of impact-resistant styrene polymers and from 80 to 20% by weight of polyphenylene ethers.

Suitable hard components are homopolymers and copolymers of styrene and of nuclear-alkylated or side-chain-alkylated styrenes. Preferably, styrene alone is used.

The hard component can be prepared by conventional methods, for example by mass, solution, suspension or aqueous emulsion polymerization of styrene.

The hard component has an intrinsic viscosity of from 40 to 140, especially from 80 to 120, ml/g. The intrinsic viscosity is determined by the method DIN 53,726, using a solution of 0.5 g of the material in 100 ml of toluene.

The most commonly used method of preparing the impact-resistant styrene polymer containing a soft component based on acrylate and butadiene is emulsion polymerization, though of course other processes can also be employed.

First, the copolymer is prepared, and in a second step styrene is then grafted on to prepare the graft copolymer.

The soft component copolymer is prepared by conventional aqueous emulsion polymerization. The comonomers employed are preferably butyl acrylate and/or ethylhexyl acrylate, in amounts of from 30 to 80% by weight of the comonomers, and butadiene in amounts of from 20 to 70, preferably from 30 to 35, % by weight of the comonomers, with or without vinyl alkyl ethers, alkyl being of 1 to 8 carbon atoms, which can be present in the copolymer in amounts of from 3 to 10, preferably from 5 to 8, % by weight. The percentages of the various monomers must add up to 100. The conventional emulsifiers, such as sodium salts of paraffinsulfonic acids of 12 to 18 carbon atoms, arylsulfonates, sodium salts of fatty acids of about 16 to 18 carbon atoms, fatty alcohol sulfates of about 12 to 18 carbon atoms, and the like, are employed, in amounts of from about 0.1 to 3% by weight, whilst the polymerization initiator used is in general a compound which forms free radicals, eg. a persulfate, peroxide, hydroperoxide or azo compound.

The use of vinyl alkyl ethers, preferably of vinyl methyl ether, in preparing the copolymer is advantageous. The vinyl alkyl ether, alkyl being of 1 to 8 carbon atoms, can all be added at the start of the polymerization, or can be added in stages. The manner in which the vinyl alkyl ethers copolymerize or act has not yet been elucidated, but we have found that the addition of these monomers, in an amount within the stated range, when carrying out the polymerization gives a copolymer with better properties than those of similar copolymers without such monomers.

The second step, namely the preparation of the graft copolymer, entails polymerizing styrene in the presence of the latex of butadiene-containing polymer, obtained above. It is advantageous if this graft copolymerization of styrene onto the butadiene-containing polymer grafting base is also carried out in aqueous emulsion under the conventional conditions described above. Copolymerization can advantageously be carried out in the same system as the emulsion polymerization in which the grafting base is prepared, where necessary with addition of further emulsifier and initiator. The styrene to be grafted onto the polymer can be added to the reaction mixture as a single shot or in several stages or, preferably, continuously during the polymerization. The graft copolymerization of styrene in the presence of the butadiene-acrylate polymer is conducted in such a way as to give from 25 to 45% by weight, preferably from 30 to 40% by weight, of grafted styrene in the graft copolymer. Since the grafting yield in this graft copolymerization is not 100%, the amount of styrene to be employed is somewhat greater than that which corresponds to the desired degree of grafting. The control of the grafting yield of the graft copolymerization and accordingly the degree of grafting of the finished graft copolymer is familiar to any skilled worker and can for example be effected by controlling the feed rate of the monomers or by adding a regulator (Chauvel and Daniel, ACS Polymer Preprints 15 (1974), 329 et seq.). The emulsion graft copolymerization in general produces about 5-15% by weight, based on the graft copolymer, of free non-grafted styrene polymer. The proportion of graft copolymer in the product obtained from the graft copolymerization is determined by the method described below.

The mean particle size and particle size distribution were determined from the integral mass distribution, by the method of W. Scholtan and H. Lange, Kolloid-Z. and Z.-Polymere 250 (1972), 728–796, using an analytical ultracentrifuge. The ultracentrifuge measurement gives the integral mass distribution of the particle diameter of a sample. From this, it is possible to deduce what percentage by weight of the particles have a diameter equal to or less than a certain size. The mean particle diameter, also referred to as the $d_{50}$ of the integral mass distribution, is, for this purpose, defined as the particle diameter.

For the purposes of the present invention, the soft component is that part of the impact-resistant polymer which is insoluble in toluene at room temperature (25° C.), minus any pigments. Accordingly, the soft component corresponds to the gel content of the product.

The polyphenylene ethers are compounds based on ortho-disubstituted polyphenylene oxides, the ether oxygen of one unit being bonded to the benzene nucleus of the adjacent unit. The average molecular length should correspond to not less than 50 units. The polyphenylene ethers may contain, in the ortho-position to the oxygen: halogen, hydrocarbon radicals which do not contain any tertiary hydrogen in the α-position, halohydrocarbon radicals, phenyl radicals and hydrocarbon-oxy radicals. Accordingly, suitable polymers include poly-(2,6-dichloro-1,4-phenylene)-ether, poly-(2,6-diphenyl-1,4-phenylene)-ether, poly-(2,6-dimethoxy-1,4-phenylene)-ether, poly-(2,6-dimethyl-1,4-phenylene)-ether and poly-(2,6-dibromo-1,4-phenylene)-ether. Preferably, poly-(2,6-dimethyl-1,4-phenylene)-ether is employed, more especially with an intrinsic viscosity of from 0.45 to 0.65 dl/g (measured in chloroform at 30° C.).

The polyphenylene ethers can, for example, be prepared from the phenols in the presence of complexing agents such as copper bromide and dibutylamine.

The mixtures of the impact-resistant styrene polymers and polyphenylene ethers can moreover contain other additives, such as pigments, dyes, fillers and flameproofing agents, other compatible polymers, antistatic agents, antioxidants and lubricants.

The novel thermoplastic molding materials are obtained by mixing the soft and hard components and the polyphenylene ether. Usually, this is effected on an apparatus which permits homogeneous mixing, such as a kneader, an extruder or a roll mill.

We have found, surprisingly, that moldings made from the novel molding material exhibit not only low dust attraction, but also high heat distortion resistance and good durability.

In the Examples and Comparative Experiments, parts are by weight.

EXAMPLES AND COMPARATIVE EXPERIMENTS

EXAMPLES

Graft copolymer 150 parts of distilled water, one part of Na $C_{14}$-alkylsulfonate, 0.2 part of potassium peroxydisulfate and 0.2 part of sodium pyrophosphate were heated to 65° C. in a stirred autoclave. 10 parts of butadiene, 10 parts of butyl acrylate and 3 parts of vinyl methyl ether were then added and the mixture was stirred for 1 hour. Thereafter, a mixture of 20 parts of butadiene and 32 parts of butyl acrylate was added continuously in the course of 6 hours. Polymerization was then continued for 2 hours, after which the autoclave was let down. The polymer dispersion obtained, which had a solids content of 33%, exhibited a narrow particle size distribution, with a mean particle diameter of 0.08 μm.

After having added 0.1 part of potassium peroxydisulfate, 25 parts of styrene were introduced into the dispersion in the course of 2 hours, and polymerization was then continued for one hour. The conversion, based on styrene, was more than 99%. The grafted rubber dispersion obtained was precipitated with calcium chloride solution and the graft copolymer was separated off and washed with distilled water.

The parts of graft copolymer, homopolystyrene of intrinsic viscosity 74 ml/g and poly-(2,6-dimethyl-1,4-phenylene)-ether shown in the Table, together with 0.8 part of tris-nonylphenyl phosphate and 1.5 parts of polyethylene, was melted, homogenized and mixed in a twin-screw extruder at 280° C., and the mixture was granulated. The poly-(2,6-dimethyl-1,4-phenylene)-ether had an intrinsic viscosity of 0.49 dl/g (measured in chloroform at 30° C.).

COMPARATIVE EXPERIMENTS

A conventional impact-resistant polystyrene was obtained by the following method.

A mixture of 7.2 parts of a polybutadiene (98% cis-structure), 85.7 parts of styrene, 6 parts of ethylbenzene and 0.1 part of octadecyl 3-(3′,5′-di-tert.-butyl-4′-hydroxyphenyl)-propionate was thermally polymerized in a 2 kettle/2 tower cascade, at a throughput of 4 liters per hour. The stirring speeds and temperatures employed in the individual reactors, and the resulting cumulative conversions, are shown below. In the third reactor, 0.02% by weight, based on styrene, of tert.-dodecylmercaptan was added continuously to the polymer stream. After polymerization, solvent and residue monomers were stripped from the mixture in a devolatilization zone at 220°–240° C.

| Position | Stirring speed [rpm] | Temp. [°C.] | Conversion (cumulative) |
|---|---|---|---|
| 1st stirred reactor | 100 | 104 | 3.8 |
| 2nd stirred reactor | 160 | 132 | 20.3 |
| 1st tower | 15 | 101 | 55.3 |
| 2nd tower | 3 | 127 | 84.3 |
| Devolatilization | — | 250 | — |

The parts by weight of impact-resistant polystyrene and poly-(2,6-dimethyl-1,4-phenylene)-ether shown in the Table, together with 0.8 part by weight of tris-nonylphenyl phosphite and 1.5 parts by weight of polyethylene, were melted, homogenized and mixed in a twin-screw extruder at 280° C., and the mixture was granulated. The poly-(2,6-dimethyl-1,4-phenylene)-ether had an intrinsic viscosity of 0.49 dl/g. The Vicat softening point was determined according to DIN 53,460/B.

To determine the dust attraction, sheets of size 160×160×2 mm were compression-molded at 200° C. For each mixture, one sheet was introduced into a dust chamber, into which air was blown in order to stir up dust, whilst one sheet was kept in a room at 30–50% relative atmospheric humidity. The formation of dust patterns on the sheet surfaces was checked after certain intervals of time.

TABLE

| Examples | Impact-resistant polystyrene comprising 45% by weight of graft copolymer and 55% by weight of homopolystrene [parts by weight] | Poly-(2,6-dimethyl-1,4-phenylene)-ether [parts by weight] | Vicat softening point [°C.] | Dust attraction and formation of dust patterns | |
|---|---|---|---|---|---|
| | | | | after 30 minutes in a dust chamber | after 30 days in the laboratory |
| 1 | 75 | 25 | 108 | no | no |
| 2 | 65 | 35 | 125 | no | no |
| 3 | 55 | 45 | 134 | no | no |
| Comparative experiments | conventional butadiene-based impact-resistant polystyrene | | | | |
| A | 75 | 25 | 110 | yes | yes |
| B | 65 | 35 | 124 | yes | yes |
| C | 55 | 45 | 134 | yes | yes |

We claim:

1. A thermoplastic molding material based on a mixture of
   (a) a styrene polymer, of intrinsic viscosity from 40 to 140 ml/g, as the hard component,
   (b) a cross-linked rubber grafted to the extent of 10 to 60% by weight with styrene, the rubber, in turn, comprising, as polymerized units, from 30 to 80% by weight of an alkyl acrylate, alkyl being of 2 to 8 carbon atoms, and from 20 to 70% by weight of butadiene, and
   (c) a polyphenylene ether having on average not less than 50 benzene units in the chain, wherein the weight ratio of a:b is (95–40):(5–60) and the weight ratio of (a+b):c is (5–90):(95–10).

2. The molding material of claim 1 wherein the cross-linked rubber contains, as polymerized units, from 3 to 10% by weight of a vinyl alkyl ether, alkyl being of 1 to 8 carbon atoms.

* * * * *